United States Patent
Bekiarian

(10) Patent No.: US 7,625,984 B2
(45) Date of Patent: Dec. 1, 2009

(54) LOW SHRINKAGE, LOW OPTICAL ABSORBANCE, LOW REFRACTIVE INDEX ADHESIVE COMPOSITION

(75) Inventor: Paul Gregory Bekiarian, Wilmington, DE (US)

(73) Assignee: Enablence Technologies USA Inc., Ottawa (CA)

( * ) Notice: Subject to any disclaimer, the term of this patent is extended or adjusted under 35 U.S.C. 154(b) by 0 days.

(21) Appl. No.: 12/030,303

(22) Filed: Feb. 13, 2008

(65) Prior Publication Data

US 2008/0139773 A1 Jun. 12, 2008

Related U.S. Application Data

(62) Division of application No. 10/983,122, filed on Nov. 5, 2004, now Pat. No. 7,390,854.

(51) Int. Cl.
*C08F 283/06* (2006.01)
*C08F 290/06* (2006.01)
*C08C 4/00* (2006.01)
*C08J 3/24* (2006.01)

(52) U.S. Cl. .......... 525/404; 525/50; 525/529; 525/530

(58) Field of Classification Search .......... 525/50, 525/404, 529, 530
See application file for complete search history.

(56) References Cited

U.S. PATENT DOCUMENTS

| | | | |
|---|---|---|---|
| 5,045,397 A | 9/1991 | Jensen | |
| 6,306,563 B1 | 10/2001 | Xu et al. | |
| 6,496,637 B2 | 12/2002 | Bloomquist et al. | |
| 6,555,288 B1 | 4/2003 | Xu et al. | |

*Primary Examiner*—Roberto Rábago
(74) *Attorney, Agent, or Firm*—Allen, Dyer, Doppelt, Milbrath & Gilchrist, P.A. Attorneys at Law

(57) ABSTRACT

This invention is directed to fluorinated acrylate compositions, which are suitable for use as low shrinkage, low absorbance refractive index matching adhesives for use in "pigtailing" polymeric integrated waveguides to optical fiber bundles.

5 Claims, 4 Drawing Sheets

LOW SHRINKAGE, LOW OPTICAL ABSORBANCE, LOW REFRACTIVE INDEX ADHESIVE COMPOSITION

FIELD OF THE INVENTION

The present invention is directed to fluorinated acrylate compositions, which are particularly well suited to be employed as low shrinkage, low absorbance refractive index matching adhesives for use in "pig-tailing" polymeric integrated waveguides to optical fiber bundles.

BACKGROUND OF THE INVENTION

The manufacture of planar lightwave component (PLC) devices, as taught in U.S. Pat. No. 6,306,563B1, U.S. Pat. No. 6,555,288B1 and U.S. Pat. No. 6,496,637B2, involves the spinning, curing and patterning of multiple thin layers of core and cladding polymers upon a rigid silicon wafer substrate to make planar polymer waveguides. Such core and cladding layers typically comprise highly fluorinated polymers characterized by low optical loss at 1550 nm. Typically these fluorinated polymers are further characterized by refractive index less than 1.4 at 1550 nm.

In common commercial practice, a large number of PLC devices are fabricated simultaneously on a single silicon wafer and the wafer so treated is then cut apart in a process known as dicing into individual PLC devices. The dicing process scars the input and/or output ends of polymeric waveguides. In many instances it is difficult to polish smooth the scarred polymeric waveguide end; as a result the imperfections so introduced may be a permanent, lossy feature of the PLC device.

According to the practice of the art, a bundle of silica optical fibers is mated and aligned to the end of a polymer waveguide on the edge of the PLC device. The components are permanently attached by use of a thin layer of optical adhesive at the interface. Such optical adhesives are typically based on epoxy curing chemistry and are designed to match the refractive index of silica (1.456 at 1550 nm). While epoxy-based optical adhesives are common, it is desirable in the art to replace them.

Optical adhesives in common use today were developed to minimize the interfacial loss between silica optical fibers and components and are thus characterized by a refractive index of ca. 1.456 at 1550 nm, the refractive index of silica. However, those adhesives are not well suited for use in coupling highly fluorinated plastic optical components either to each other, or to silica components because they do nothing to reduce the effects of interfacial roughness at the plastic optical interface. The large refractive index contrast between the highly fluorinated polymer waveguide of the PLC device and common adhesives cause the facets on the surface of the polymer waveguide to stand out in the optical path and scatter incident light resulting in optical loss and noise. A transparent adhesive is desired which is characterized by a refractive index that matches the refractive index of highly fluorinated polymer waveguides. Which is typically in the range of 1.35-1.39 at 1550 nm.

One approach to the problem is to employ adhesives based upon fluorinated acrylate chemistry similar to that of well-known polymeric waveguides. However, those adhesives known in the art are subject to unacceptably high shrinkage during curing. In the art, prior to curing, the optical components being mated are carefully aligned to ensure maximum optical power transmission across the interface. After the components are aligned, the adhesive is cured. Low shrinkage of the adhesive layer during curing is highly desirable because it is critical that the optical components being bonded maintain their position of alignment during the adhesive curing process. An adhesive composition that exhibits high shrinkage during curing will cause the components it is bonding together to shift in relation to one another, and thus results in misalignment of the optical connection. The present invention provides a significant improvement to the art by providing a low refractive index, low shrinkage fluoroacrylate adhesive with low absorbance at 1550 nm wavelength.

U.S. Pat. No. 5,045,397 teaches the preparation of low refractive index polymerizable fluids from mixtures of low molecular weight fluorinated acrylates and discloses their utility as adhesives to bond pieces of glass.

SUMMARY OF THE INVENTION

The present invention provides a liquid composition comprising a first diacrylate, I,

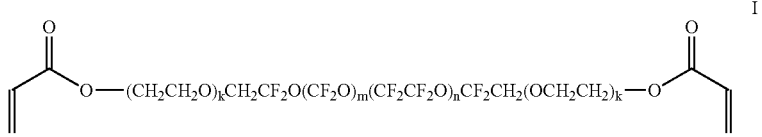

wherein m and n are integers, k=0-2, and the molecular weight is in the range of 1000-4000 Da;

and a second diacrylate, II,

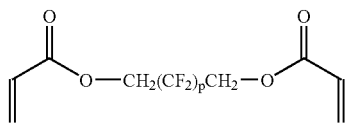

where p=2-6.

Further provided in the present invention is a composition comprising cross-linked monomer units of a first acrylate diradical, Ia,

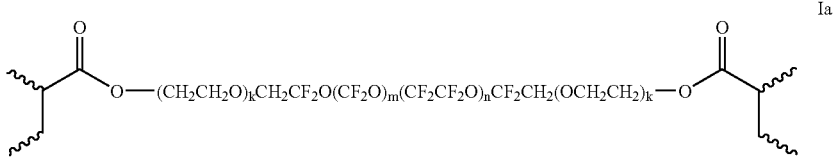

wherein m and n are integers, k=0-2, the molecular weight is in the range of 1000-4000 Da, and the wavy bonds indicate a radical; and, a second acrylate diradical, IIa,

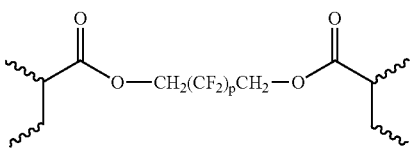

wherein p=2-6 and the wavy bonds indicate a radical.

Further provided is an article comprising a first shaped moiety having a first surface, a second shaped moiety having a second surface, said first and second surfaces independently consisting essentially of a fluorinated organic polymer, silica, or silicon; and a composition disposed between and bonding together said first surface and said second surface; said composition comprising cross-linked monomer units of a first acrylate diradical, Ia,

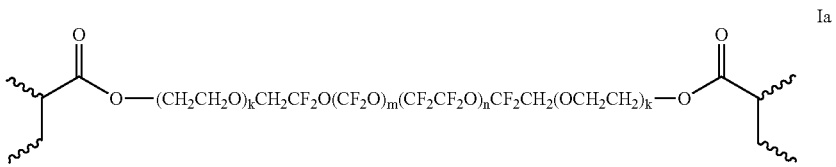

wherein m and n are integers, k=0-2, the molecular weight of diradical Ia is in the range of 1000-4000 Da, and the wavy bonds indicate a radical; and, a second acrylate diradical, IIa,

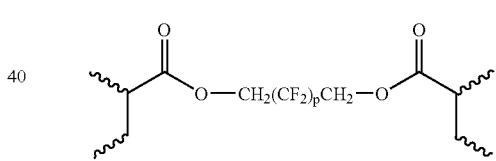

wherein p=2-6 and the wavy bonds indicate a radical.

Further provided is a method for effecting bonding the method comprising positioning a first shaped article having a first surface proximate to a second shaped article having a second surface such that said first surface is separated from said second surface by a gap 0.1 to 100 micrometers across, said first surface and said second surface independently consisting essentially of silica, silicon, or a fluorinated organic polymer;

causing to reside in said gap a liquid composition in such manner that both said first surface and said second surface are contacted with said composition, said liquid composition comprising a first diacrylate, I,

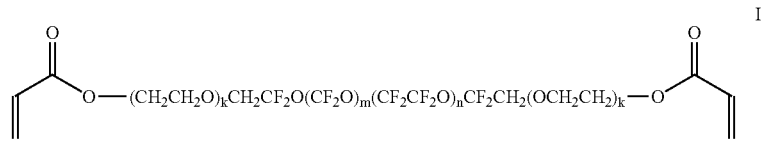

wherein m and n are integers, k=0-2, and the molecular weight is in the range of 1000-4000 Da;

and a second diacrylate, II,

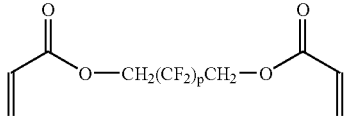

II where p=2-6.

causing free radicals to be introduced into said composition in such manner as to cause a cross-linking reaction to occur;

allowing the free-radical induced cross-linking reaction to take place until said liquid composition has become clear, hard, glassy, non-flowing and rigid.

DETAILED DESCRIPTION OF THE INVENTION

Figure 1:
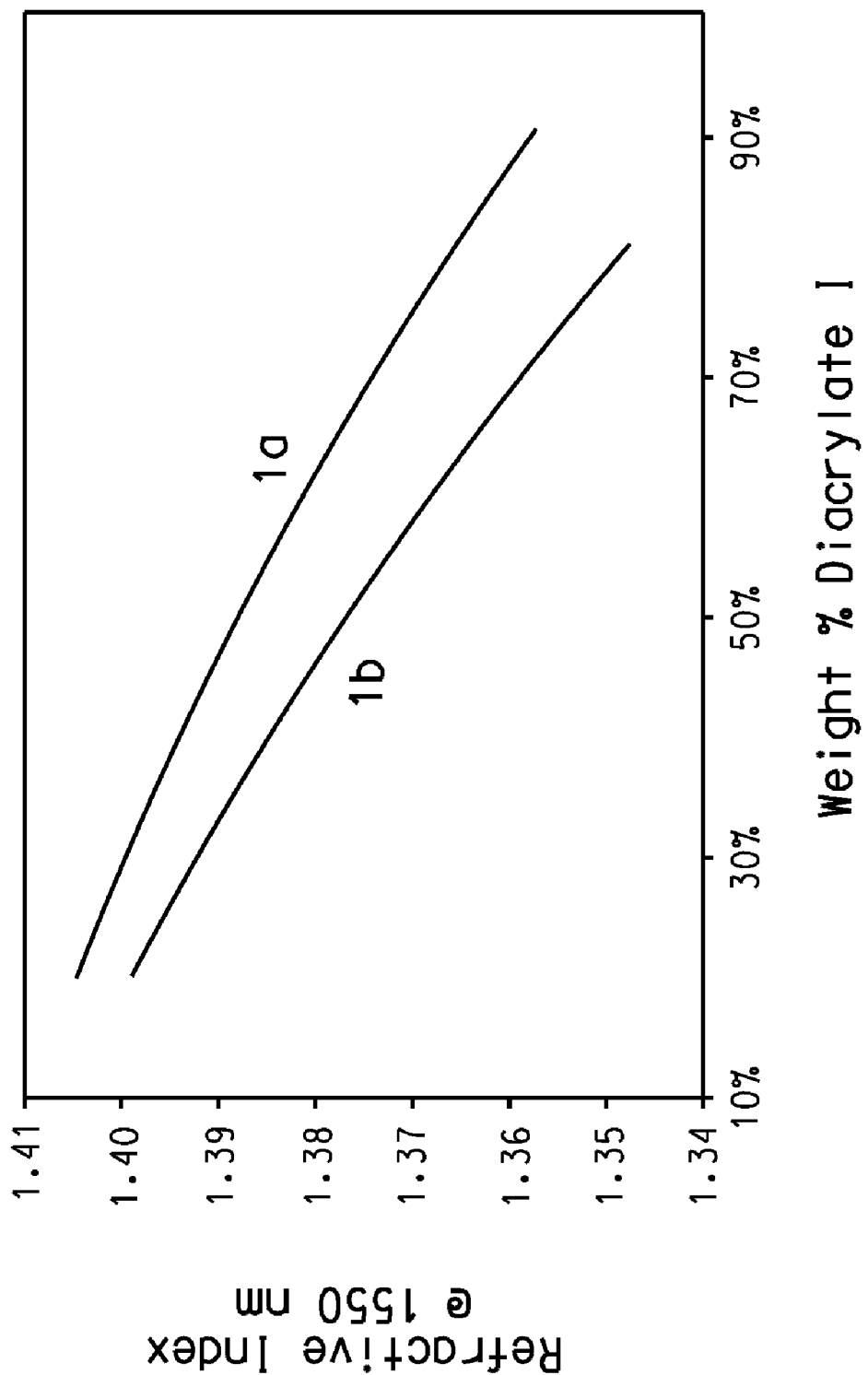
FIG. 1 shows the dependency of refractive index on composition of the composition of the invention.

The interface between discrete components of optical communication systems represents a significant source of optical power attenuation and introduces undesirable reflections and phase shifting and polarization dependent loses.

One sensitive area is called "pig-tailing" where one or more optical fibers are coupled to one or more optical waveguides integrated on a photonic chip using optical adhesives.

The optical adhesive compositions of the present invention are designed to have a low refractive index which preferably matches the refractive index of the planar polymer waveguides of the PLC device to make pits and facets on the face of the polymer waveguide invisible to incident light, thereby reducing the return loss due to interfacial scattering back along the incident beam.

This invention relates to a cross-linkable liquid composition comprising fluorinated oligomeric diacrylates which composition is characterized by a refractive index of 1.33-1.40 at 1550 nm, optical loss of less than 0.5 dB/cm at 1550 nm, and low shrinkage during curing. By virtue of the optical properties thereof, the liquid composition of the invention is particularly well suited for effecting attachment of a silica optical fiber bundle to the edge of a fluoropolymeric planar lightwave component (PLC) device, that is for "pigtailing." In the method of the invention, the liquid composition hereof is disposed between and in contact with the surfaces of two shaped articles, a first surface of a first shaped article and a second surface of a second shaped article each said surface independently consisting essentially of silica, silicon, or a fluorinated organic polymer. Preferably at least one said surface consists essentially of a fluorinated organic polymer. More preferably, the other said surface consists essentially of silica. Most preferably said silica surface is treated with an adhesion promoter.

The liquid composition is then subject to cross-linking thereby effecting a bond between said surfaces. In a preferred embodiment, the two surfaces are optically transmitting surfaces. In a more preferred embodiment said first shaped article is a PLC device and said second shaped article is an optical fiber bundle consisting of one or more silica core optical fibers.

As described herein below, the compositions of the present invention are prepared by combining a so-called diacrylate I with a so-called diacrylate II in various proportions. Those proportions are described in terms of a ratio of the weight of diacrylate I to the weight of diacrylate II. The compositions hereof may contain additional additives, as herein below described, such as free-radical initiators or a polymeric viscosity modifier, as well as such other additives as are commonly employed in the art which are consistent with the requirements of the highly demanding optical applications towards which the present invention is directed in the preferred embodiments hereof. The concentration of each of the several optional additives in the compositions hereof is expressed in parts per hundred (pph), independently of the concentrations of any other additive to the composition hereof.

The term "pph" shall be understood to refer to the number of parts by weight of the optional additive per one hundred parts by weight of the combination of diacrylate I, and diacrylate II. For example, if 2 grams of a free-radical initiator were combined with 35 grams of diacrylate I and 15 grams of diacrylate II, the concentration of said initiator would be stated as 4 pph. To extend this example a bit further, were 3.5 grams of a polymeric viscosity modifier added to the initiator-containing composition, it would be said to be at a concentration of 7 pph.

As employed herein, the term "cross-linked" shall be understood to denote a three-dimensional network formed of covalent bonds bridged by diacrylate radical moieties as herein below described. The term "cross-linking" shall be understood to refer to the action by which the diacrylates of the invention undergo free-radical addition to form the cross-linked structure hereof.

As employed herein, the terms "cured" and "cross-linked" and "curing" and "cross-linking" are synonymous. Strictly speaking the terms are not quite synonymous. The term "curing" refers to the process by which cross-linking is effected. The resulting structure is cross-linked, the non-cross-linked precursor having been cured. However, in common use in the art the terms "cured" and "cross-linked" are employed synonymously, and that is the convention that is followed here.

The present invention provides for a liquid composition characterized by a refractive index in the range of 1.33 to 1.40 at 1550 nm, an optical absorbance at 1550 nm<0.5 dB/cm, and a shrinkage index of 0.01 to 0.1. Shrinkage index is a figure of merit, which is described in detail herein below.

In a first embodiment of the present invention is provided a liquid composition comprising a first diacrylate, I,

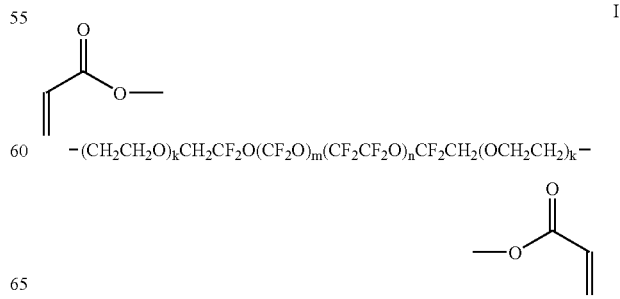

I wherein m and n are integers, k=0-2, and the molecular weight is in the range of 1000-4000 Da;

and a second diacrylate, II,

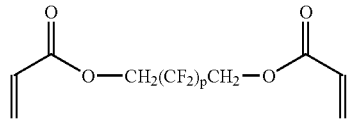

where p=2-6.

The liquid composition hereof may further comprise up to 5 pph of a photo-activated or thermally activated free-radical initiator, but such is not a fundamental limitation on the present invention. As contemplated in the present invention, the liquid composition hereof is intended to undergo cross-linking to form an adhesive bond between optical components. The cross-linking according to the method of the invention is effected by free-radical polymerization. Free radicals may be generated by any method known in the art. This may include, for example, ultraviolet or thermal activation of a free radical initiator, which in a preferred embodiment has been incorporated into the parent liquid composition. However, free radicals may also be generated by exposure to ionizing radiation such as gamma rays or $Co^{60}$ radiation. In the latter two embodiments, no separate initiator is required since the ionizing radiation induces ionization of the diacrylates directly thereby forming free radicals.

The art of addition polymerization teaches bulk polymerizations and suspension polymerizations wherein the initiator is soluble in the monomer, as well as solution polymerization wherein the monomer and the initiator are both soluble in a common solvent. The art also teaches emulsion polymerization where the initiator is not soluble in the monomer. Also taught are homogeneous polymerizations in which the polymer is soluble in the monomer, and heterogeneous polymerizations wherein the polymer is not soluble in the monomer. The practitioner hereof will appreciate that for the purposes of the preferred embodiment of the present invention—coupling of components in optical communications systems with minimal interference with the propagating signal—it is important that all the components of the liquid composition hereof be mutually soluble within the concentration ranges employed in order to avoid light scattering. If the components are not strictly soluble, then any insoluble species must be at least an order of magnitude smaller in size than the wavelength of the propagating optical signal in order to minimize scattering.

Because the polymerization according to the present invention is in situ cross-linking reactions to form a polymer, which in a preferred embodiment must remain optically clear, it is important to maintain a single phase to avoid light scattering. Thus, in a preferred embodiment, polymerization according to the present invention must be effected using an initiator, which is soluble in the monomer, and wherein, the polymer and monomer are miscible. Of course, as has been said, if free-radical initiation is by ionizing radiation, a separate initiator need not be used.

In a further embodiment the liquid composition hereof may further comprise 0.5 to 10 pph, preferably 6-8 pph of a polymer shown in formula III

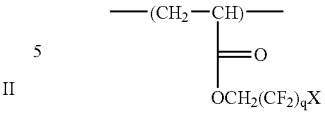

wherein q=1-2 and X=F or H.

The long-chain fluorinated ether diacrylates, I, may be prepared in accord with the teachings of U.S. Pat. No. 6,496,637 by reaction of a carboxyl-functionalized acrylate, such as acrylic acid, methacrylic acid or the corresponding acid chlorides, with long-chain fluorinated ether diols ranging in molecular weight from ca. 1000 to 4000 Da, preferably ca. 1000 to 2000 Da. Long chain fluorinated ether diols suitable for preparing the diacrylates of the invention are available from Solvay-Solexis under the name Fluorolink®. Preferred are Fluorolink® D or Fluorolink® D10 which have the general structure HO—CH2CF2O(CF2O)m(CF2CF2O) nCF2CH2-OH, where m and n are integers, or Fluorolink® E or Fluorolink® E10 which have the general structure HO—(CH2CH2O)kCH2CF2O(CF2O)m(CF2CF2O)nCF2CH2 (OCH2CH2)k-OH where m and n are integers and k=1-2. Fluorolink® D and E have a molecular weight of about 2000 and Fluorolink® D10 and E10 have a molecular weight of about 1000.

In a preferred embodiment, the refractive index of the liquid composition of the invention is adjusted to match the refractive index of the planar polymer waveguide. The refractive index of the adhesive compositions is controlled by the concentration ratio of the diacrylates I and II. This is shown graphically in FIG. 1 for a specific embodiment hereof. In curve 1a, is depicted the functional dependence of refractive index on the percentage of that embodiment of diacrylate I wherein k=1-2, as combined with that embodiment of diacrylate II wherein p=4. In curve 1b is depicted the functional dependence of refractive index on the percentage of that embodiment of diacrylate I wherein k=0, as combined with that embodiment of diacrylate II wherein p=4.

Dissolved polymer III may optionally be present in the formulation of the liquid composition hereof as a viscosity modifier. The presence of dissolved polymer III at 0.5-10 pph in the formulation has a small effect on the refractive index of the adhesive compositions and may be ignored in most cases. If precise control of refractive index is required, the presence of dissolved polymer III must be compensated for in the formulation by the adjustment of the relative concentrations of diacrylates I and II.

In a preferred embodiment of the liquid composition of the invention, the weight ratio of diacrylate I to diacrylate II is in the range of 30:70 to 100:0, while polymer III is present at a concentration of 0.5-10 pph In a first more preferred embodiment of the liquid composition of the invention, k=0 and p=4, and the weight ratio of diacrylate I to diacrylate II is in the range of 40:60 to 80:20, while polymer III, where q=1 and X=F is present at a concentration of 7 pph. In a further more preferred embodiment of the first more preferred embodiment of the liquid composition of the invention, the molecular weight of diacrylate I is in the range of 1000-2000.

In a second more preferred embodiment, k=1 or 2, p=4 and the weight ratio of diacrylate I to diacrylate II is in the range of 60:40 to 90:10, while polymer III, where q=1 and X=F is present at a concentration of 7 pph. In a further more preferred embodiment of the second more preferred embodiment of the liquid composition of the invention, the molecular weight of diacrylate I is in the range of 1000-2000.

In a first still more preferred embodiment, k=0, p=4, the molecular weight of diacrylate I is in the range of 1000-2000, the weight ratio of diacrylate I to diacrylate II is in the range of 53:47 to 54:46, and polymer III, where q=1, X=F, is present at a concentration of 7 pph The cured adhesive formulation resulting therefrom exhibits a refractive index of 1.37 at a wavelength of 1550 nm.

In a second still more preferred embodiment, k=1 or 2, p=4, the molecular weight of diacrylate I is in the range of 1000-2000, the weight ratio of diacrylate I to diacrylate II is in the range of 71:29 to 72:28, and polymer III, where q=1, X=F, is

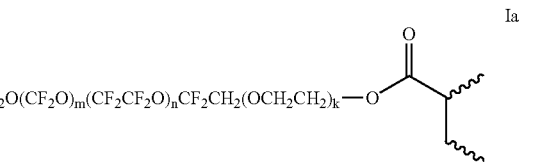

present at a concentration of 7 pph The cured adhesive formulation resulting therefrom exhibits a refractive index of 1.37 at a wavelength of 1550 nm.

In a third still more preferred embodiment, k=1 or 2, p=4, the molecular weight of diacrylate I is in the range of 1000-2000, the weight ratio of diacrylate I to diacrylate II is in the range of 89:11 to 90:10, and polymer III, where q=1, X=F, is present at a concentration of 7 pph The cured adhesive formulation resulting therefrom exhibits a refractive index of 1.36 at a wavelength of 1550 nm.

According to the method of the present invention, diacrylate I is combined with diacrylate II and the combination so-formed, including any additives, is subject to cross-linking. Both diacrylates are liquids at room temperature, and are miscible.

According to the method of the present invention, cross-linking is effected by free radical attack on the difunctional acrylates. The free radicals necessary to effect cross-linking among the diacrylates may be generated by any convenient means known in the art. These means include subjecting the combination of diacrylates to ionizing radiation, such as gamma irradiation, or activation of a free-radical initiator added to the combination of diacrylates. Both thermally activated and optically activated free-radical initiators may be employed.

There are many free radical initiators known in the art. When the composition of the invention is intended to be employed in critical optical applications, it is of particular importance that any free-radical initiator employed in the process hereof be soluble in the diacrylate composition and leave no insoluble residue after completion of the cross-linking reaction.

In a preferred embodiment, a soluble aromatic hydroxyketone photo-radical generator is added to the liquid composition hereof at a concentration in the range of 1-5 pph and cross-linking is effected by exposure to ultraviolet irradiation. Commercially available aromatic hydroxyketones such as Irgacure-184 or Darocur-1173 (CIBA Additives) have been found satisfactory. In another embodiment, a soluble azo-initiator is added to the liquid adhesive composition hereof in the range of 1-5 pph, and cross-linking is effected by thermal irradiation. Azo-initiators such as 2,2'-azobisisobutyronitrile may added in 1-5 pph to enable the optical adhesive composition to be cured in place by the application of thermal radiation.

In a more preferred embodiment, 2 pph Darocur-1173 is added to the liquid composition of the invention, which is then cured in place by the application of UV radiation. The UV curing process may be conducted in air or optionally a stream of inert gas could be directed across the interface.

In a further embodiment of the invention is provided a cross-linked composition comprising cross-linked monomer units of a first acrylate diradical, Ia,

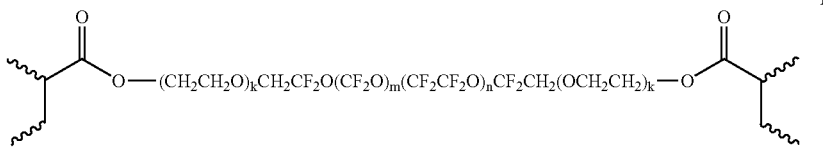

wherein m and n are integers, k=0-2, the molecular weight is in the range of 1000-4000 Da, and the wavy bonds indicate a radical; and, a second acrylate diradical, IIa,

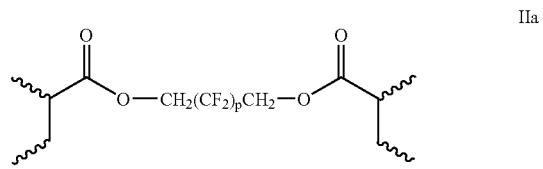

wherein p=2-6 and the wavy bonds indicate a radical.

In the event that polymer III is present in the liquid composition of the invention prior to cross-linking it will be present in the cross-linked composition hereof as well.

In a preferred embodiment of the cross-linked composition of the invention, the weight ratio of acrylate diradical Ia to acrylate diradical IIa is in the range of 30:70 to 100:0, and said cross-linked composition further comprises 0.5 to 10 pph of a polymer represented by the formula III

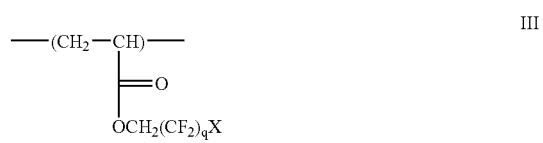

where q=1-2 and X=F or H.

In a first more preferred embodiment of the cross-linked composition of the invention, k=0 and p=4, and the weight ratio of acrylate diradical Ia to acrylate diradical IIa is in the range of 40:60 to 80:20, while polymer III, where q=1 and X=F is present at a concentration of 7 pph. In a further more preferred embodiment of the first more preferred embodiment of the cross-linked composition of the invention, the molecular weight of acrylate diradical Ia is in the range of 1000-2000.

In a second more preferred embodiment of the cross-linked composition of the invention, k=1 or 2, p=4 and the weight ratio of acrylate diradical Ia to acrylate diradical IIa is in the range of 60:40 to 90:10, while polymer III, where q=1 and X=F is present at a concentration of 7 pph. In a further more preferred embodiment of the second more preferred embodiment of the cross-linked composition of the invention, the molecular weight of acrylate diradical Ia is in the range of 1000-2000.

In a first still more preferred embodiment of the cross-linked composition of the invention, k=0, p=4, the molecular weight of acrylate diradical Ia is in the range of 1000-2000, the weight ratio of acrylate diradical Ia to acrylate diradical IIa is in the range of 53:47 to 54:46, and polymer III, where q=1, X=F, is present at a concentration of 7 pph The cross-linked composition of the invention resulting therefrom exhibits a refractive index of 1.37 at a wavelength of 1550 nm.

In a second still more preferred embodiment of the cross-linked composition of the invention, k=1 or 2, p=4, the molecular weight of acrylate diradical Ia is in the range of 1000-2000, the weight ratio of acrylate diradical Ia to acrylate diradical IIa is in the range of 71:29 to 72:28, and polymer III, where q=1, X=F, is present at a concentration of 7 pph The cross-linked composition of the invention resulting therefrom exhibits a refractive index of 1.37 at a wavelength of 1550 nm.

In a third still more preferred embodiment of the cross-linked composition of the invention, k=1 or 2, p=4, the molecular weight of acrylate diradical Ia is in the range of 1000-2000, the weight ratio of acrylate diradical Ia to acrylate diradical IIa is in the range of 89:11 to 90:10, and polymer III, where q=1, X=F, is present at a concentration of 7 pph The cross-linked composition of the invention resulting therefrom exhibits a refractive index of 1.36 at a wavelength of 1550 nm.

The liquid composition of the invention is useful in itself as for example an index matching fluid or a liquid lens. It finds further utility as a precursor to the cross-linked composition of the invention, as described herein. The cross-linked composition of the invention has utility itself for example in index matching where a liquid is undesirable, or in the fabrication of shaped or molded articles particularly where optical clarity in the near infrared is desired. One particularly notable application for the cross-linked composition of the invention is as an optically clear adhesive for bonding shaped articles together, where, in a preferred embodiment, one of the shaped articles is made of a fluorinated organic polymer and the other shaped article is made of a fluorinated organic polymer, silica, or silicon. Preferably the other object is made of silica.

While there is no necessary limitation that the cross-linked composition of the invention provide bonding to optically transmitting shaped articles it is contemplated that such use represents a high value application thereof.

In use, the liquid composition of the invention will be synthesized to provide a refractive index equal to that of the core of a fluorinated organic polymer waveguide PLC in order to "smooth out" the irregularities imposed on the surface thereof during the fabrication process, as herein above described.

Accordingly, the present invention provides for a method for effecting bonding the method comprising positioning a first shaped article having a first surface proximate to a second shaped article having a second surface such that said first surface is separated from said second surface by a gap 0.1 to 100 micrometers across, said first surface and said second surface independently consisting essentially of silica, silicon, or a fluorinated organic polymer;

causing to reside in said gap a liquid composition in such manner that both said first surface and said second surface are contacted with said composition, said liquid composition comprising a first diacrylate, I,

—O—(CH$_2$CH$_2$O)$_k$CH$_2$CF$_2$O(CF$_2$O)$_m$(CF$_2$CF$_2$O)$_n$CF$_2$CH$_2$(OCH$_2$CH$_2$)$_k$—O—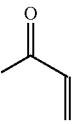   I wherein m and n are integers, k=0-2, and the molecular weight is in the range of 1000-4000 Da;

and a second diacrylate, II,

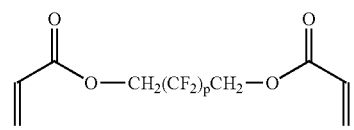   II where p=2-6.

causing free radicals to be introduced into said composition in such manner as to cause a cross-linking reaction to occur;

allowing the free-radical induced cross-linking reaction to take place until said liquid composition liquid composition has become clear, hard, glassy, non-flowing and rigid.

According to the method of the present invention, the liquid composition hereof undergoes cross-linking to form the cross-linked composition hereof. The liquid composition hereof is substantially free-flowing, the viscosity thereof controlled by the molecular weight of the diacrylates and the concentration of polymer III therein incorporated. In the cross-linked composition hereof the liquid composition has been transformed by the curing process hereof from a free-flowing liquid to a cross-linked, clear, hard, glassy, non-flowing rigid solid polymer which bonds said first surface and said second surface together; said cross-linked polymer is not soluble in solvents which otherwise do not chemically degrade it and said cross-linked polymer does not flow at elevated temperatures which are below the temperature at which said cross-linked polymer degrades.

According to the method of the present invention, there may be included in said liquid composition 0.5-5 pph of a free radical initiator, as described herein above.

In a preferred embodiment of the method of the invention in said liquid composition the weight ratio of diacrylate I to diacrylate II is in the range of 30:70 to 100:0, and said liquid composition further comprises 0.5 to 10 pph of a polymer represented by the formula III

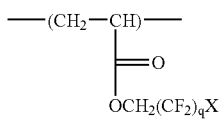

where q=1-2 and X=F or H.

In a first more preferred embodiment of the method of the invention, in said liquid composition, k=0 and p=4, and the weight ratio of diacrylate I to diacrylate II is in the range of 40:60 to 80:20, while polymer III, where q=1 and X=F is present at a concentration of 7 pph. In a further more preferred embodiment of the first more preferred embodiment of the method of the invention, the molecular weight of diacrylate I is in the range of 1000-2000.

In a second more preferred embodiment of the method of the invention, in said liquid composition, k=1 or 2, p=4 and the weight ratio of diacrylate I to diacrylate II is in the range of 60:40 to 90:10, while polymer III, where q=1 and X=F is present at a concentration of 7 pph. In a further more preferred embodiment of the second more preferred embodiment of the method of the invention, the molecular weight of diacrylate I is in the range of 1000-2000.

In a first still more preferred embodiment of the method of the invention, in said liquid composition k=0, p=4, the molecular weight of diacrylate I is in the range of 1000-2000, the weight ratio of diacrylate I to diacrylate II is in the range of 53:47 to 54:46, and polymer III, where q=1, X=F, is present at a concentration of 7 pph The cured adhesive formulation resulting therefrom exhibits a refractive index of 1.37 at a wavelength of 1550 nm.

In a second still more preferred embodiment of the method of the invention, in said liquid composition k=1 or 2, p=4, the molecular weight of diacrylate I is in the range of 1000-2000, the weight ratio of diacrylate I to diacrylate II is in the range of 71:29 to 72:28, and polymer III, where q=1, X=F, is present at a concentration of 7 pph The cured adhesive formulation resulting therefrom exhibits a refractive index of 1.37 at a wavelength of 1550 nm.

In a third still more preferred embodiment of the method of the invention, in said liquid composition, k=1 or 2, p=4, the molecular weight of diacrylate I is in the range of 1000-2000, the weight ratio of diacrylate I to diacrylate II is in the range of 89:11 to 90:10, and polymer III, where q=1, X=F, is present at a concentration of 7 pph The cured adhesive formulation resulting therefrom exhibits a refractive index of 1.36 at a wavelength of 1550 nm.

In a further embodiment of the method of the invention, the bonded shaped moieties are capable of transmitting light through said surfaces.

In order to enhance the adhesive strength of the bond formed according to the method of the invention, an adhesion promoter may be advantageously employed. It is found in the practice of the invention that acrylic functionalized silanes are effective for the purposes of the present invention, such as 3-acryloxypropyl-1-trimethoxysilane, 3-acryloxypropyl-1-trichlorosilane. In a preferred embodiment, 3-acryloxypropyl-1-trimethoxysilane is added directly to the adhesive formulation at a concentration of 1-5 pph. More preferably, the adhesion promoter can be first applied, as the pure compound or as a solution of any concentration >1 wt % in an inert solvent such as toluene or tetrahydrofuran, to the silica/silicon surfaces of the optical components before the adhesive formulation is applied and the optical components are brought together.

According to the method of the invention, the two surfaces to be bonded are positioned at a distance of 0.1 to 100 micrometers from each other, thereby forming a gap between the two said surfaces. The liquid composition of the invention is disposed in the gap between the two surfaces, and then the liquid composition is cured to form the desired bond between the two surfaces. It is immaterial to the operability of the present invention whether the two surfaces are first positioned with a gap of 0.1 to 100 micrometers between them followed by application of the liquid composition in the gap, or the liquid composition is first applied to one or both surfaces followed by positioning said surfaces at a distance of 0.1 to 100 micrometers.

The exact distance between the surfaces is not highly important to the operability of the invention. The distance must be sufficiently small for bonding to be successfully effected. When the gap is larger than 100 micrometers, the necessary viscosity of the liquid composition hereof may be undesirably high. When the gap is less than 0.1 micrometer, it is difficult in practice to achieve uniform spreading of the liquid composition, and there is increased risk of the bonding surfaces abrading one another.

The composition of the present invention is useful as an adhesive for binding silica, silicon, or polyfluoroacrylic materials to themselves or one another. While there is no limitation on the application of the adhesive hereof in that regard, the adhesive hereof is particularly well-suited to bonding light-transmitting articles to one another, particularly polyfluoroacrylate optical waveguides to optical fiber "pig-tails."

Accordingly, in a further embodiment of the present invention is provided is an article comprising a first shaped moiety having a first surface, a second shaped moiety having a second surface, each of said first and second surfaces independently consisting essentially of a fluorinated organic polymer, silica, or silicon, and a composition disposed between and bonding together said first surface and said second surface, said composition comprising cross-linked monomer units of a first acrylate diradical, Ia,

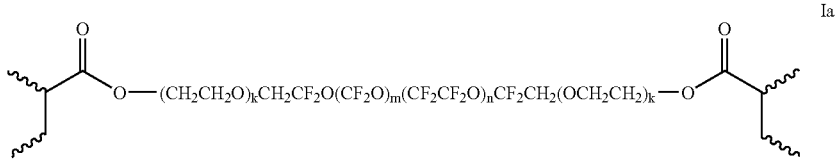

wherein m and n are integers, k=0-2, the molecular weight of diradical I is in the range of 1000-4000 Da, and the wavy bonds indicate a radical; and, a second acrylate diradical, IIa,

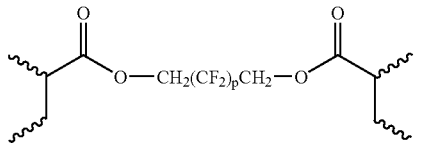

IIa wherein p=2-6 and the wavy bonds indicate a radical.

In a preferred embodiment of the shaped article of the invention, in the cross-linked composition, the weight ratio of acrylate diradical Ia to acrylate diradical IIa is in the range of 30:70 to 100:0, and said cross-linked composition further comprises 0.5 to 10 pph of a polymer represented by the formula III

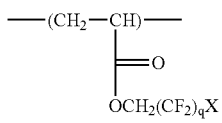

III where q=1-2 and X=F or H.

In a first more preferred embodiment of the shaped article of the invention, in the cross-linked composition of the invention, k=0 and p=4, and the weight ratio of acrylate diradical Ia to acrylate diradical IIa is in the range of 40:60 to 80:20, while polymer III, where q=1 and X=F is present at a concentration of 7 pph. In a further more preferred embodiment of the first more preferred embodiment of the shaped article of the invention, the molecular weight of acrylate diradical Ia is in the range of 1000-2000.

In a second more preferred embodiment of the shaped article of the invention, k=1 or 2, p=4 and the weight ratio of acrylate diradical Ia to acrylate diradical IIa is in the range of 60:40 to 90:10, while polymer III, where q=1 and X=F is present at a concentration of 7 pph. In a further more preferred embodiment of the second more preferred embodiment of the shaped article of the invention, the molecular weight of acrylate diradical Ia is in the range of 1000-2000.

In a first still more preferred embodiment of the shaped article of the invention, k=0, p=4, the molecular weight of acrylate diradical Ia is in the range of 1000-2000, the weight ratio of acrylate diradical Ia to acrylate diradical IIa is in the range of 53:47 to 54:46, and polymer III, where q=1, X=F, is present at a concentration of 7 pph The cured adhesive formulation resulting therefrom exhibits a refractive index of 1.37 at a wavelength of 1550 nm.

In a second still more preferred embodiment of the shaped article of the invention, k=1 or 2, p=4, the molecular weight of acrylate diradical Ia is in the range of 1000-2000, the weight ratio of acrylate diradical Ia to acrylate diradical IIa is in the range of 71:29 to 72:28, and polymer III, where q=1, X=F, is present at a concentration of 7 pph The cured adhesive formulation resulting therefrom exhibits a refractive index of 1.37 at a wavelength of 1550 nm.

In a third still more preferred embodiment of the shaped article of the invention, k=1 or 2, p=4, the molecular weight of acrylate diradical Ia is in the range of 1000-2000, the weight ratio of acrylate diradical Ia to acrylate diradical IIa is in the range of 89:11 to 90:10, and polymer III, where q=1, X=F, is present at a concentration of 7 pph The cured adhesive formulation resulting therefrom exhibits a refractive index of 1.36 at a wavelength of 1550 nm.

In a further embodiment of the shaped article of the invention, said shaped moieties are capable of transmitting light.

EXAMPLES

A. Methods

Differential scanning calorimetry (DSC) was employed according to the method of ASTM D-3417-83, except using a heating rate of 20° C./min. Tg designates the polymer glass transition temperature as determined at the midpoint of the transition.

Gel permeation chromatography (GPC) was employed to determine molecular weight of polymers using an Alliance 2690 Size Exclusion Chromatography System coupled to a Model 410 refractive index detector, both made by Waters Corporation, in accordance with the manufacturer's operating instructions. The results were calibrated against a set of 10 narrow polydispersity polystyrene standards, obtained from Polymer Laboratories, with peak molecular weights from 840 through 6,700,000.

Refractive index was measured on thin polymer films using a Metricon Model 2010 Thin Film Thickness/Refractive Index Measurement System in accordance with the manufacturers operating instructions. Thin films of polymers were prepared by dissolving the polymer in a suitable solvent, such as methylethylketone or propylacetate, filtering the solution through a 0.2 μm filter then casting a thin film onto a glass substrate. The solvent was allowed to evaporate at room temperature; the resulting polymer film was baked at 100° C. in a circulating air oven for 24 hr before analysis. Cured thin films of the liquid adhesive compositions of the invention were prepared as described in the examples below.

Optical loss was measured on 1 cm thick samples contained in quartz cuvettes and prepared as described in the examples below. Using a Lasermax® diode laser at 1550 nm, the input light intensity ($I_{in}$) was measured with no sample in the beam; the output light intensity ($I_o$) was measured with the sample cuvette in the beam at an angle of 2° from normal incidence. The light intensity was measured by collecting the light in a 2 inch integrating sphere equipped with an indium gallium arsenide photo-diode detector (OSI Fibercom Inc. FCIINGAAS-3000-5). The sample loss in dB/cm was calculated from the equation:

$$\text{loss(dB/cm)} = 10 \log_{10}(t_{loss})/(\text{sample thickness (cm)})$$

Figure 2:
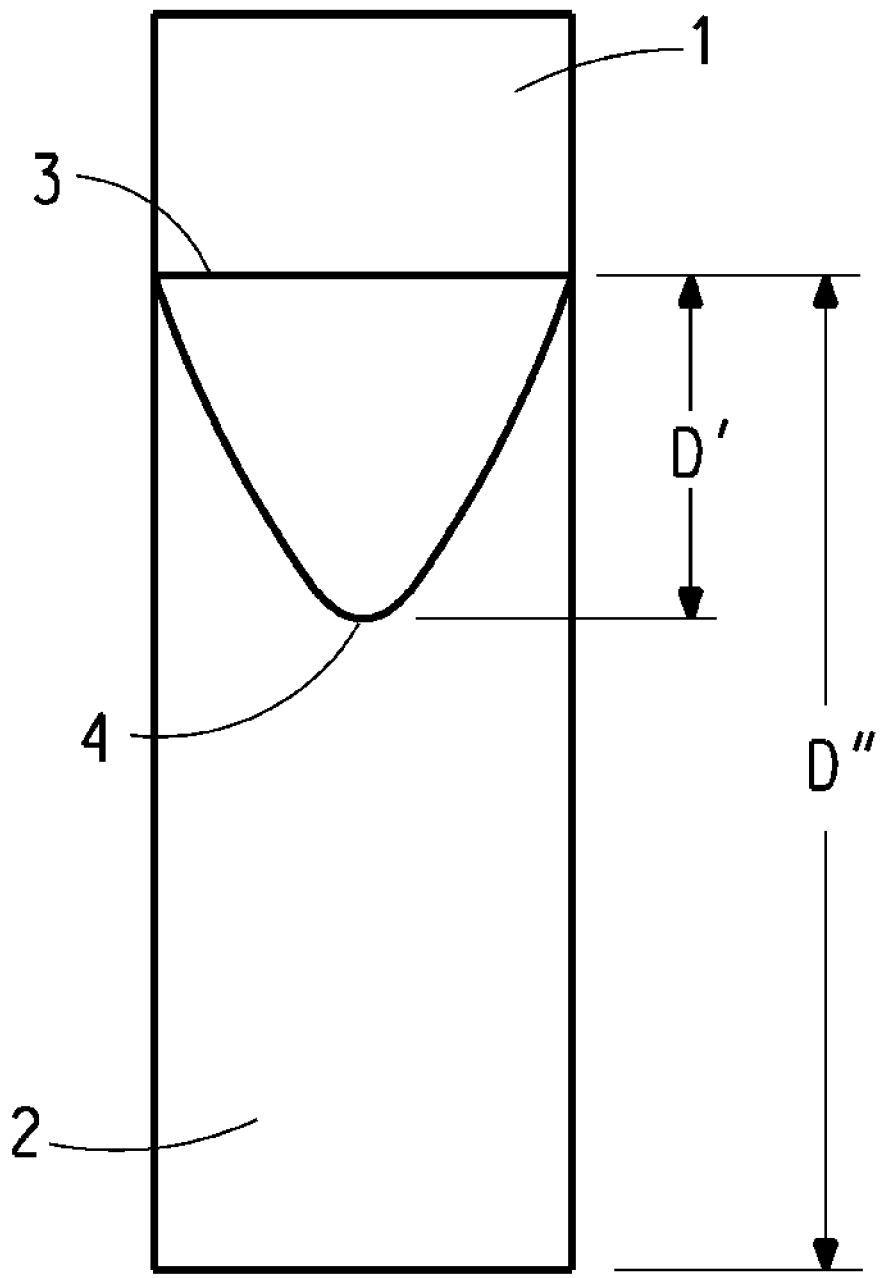
FIG. 2 is a schematic representation of the method for computing shrinkage index.

The calculation of $t_{loss}$ included a correction to remove the effect of multiple reflections at the 4 surfaces of the sample contained in the cuvette (there were 2 quartz-air and 2 quartz-sample interfaces). The calculation of $t_{loss}$ was obtained by the iterative numerical solution of the equation:

$$t_{loss} = (I_o/I_{in})/(Z_1 + Z_2 + Z_3 + Z_4 + Z_5 + Z_6 + Z_7)$$

where:

$$Z_1 = (1-r_1)*(1-r_2)*(1-r_3)*(1-r_4)$$

$$Z_2 = (1-r)*(1-r_2)*(1-r_3)*(1-r_4)*r_3*r_4$$

$$Z_3 = (1-r_1)*(1-r_2)*(1-r_3)^3*(1-r_4)*r_2*r_4*t_{loss}^2$$

$$Z_4 = (1-r_1)*(1-r_2)^3*(1-r_3)^3*(1-r_4)*r_1*r_4*t_{loss}^2$$

$$Z_5 = (1-r_1)*(1-r_2)*(1-r_3)*(1-r_4)*r_2*r_3*t_{loss}^2$$

$$Z_6 = (1-r_1)*(1-r_2)^3*(1-r_3)*(1-r_4)*r_1*r_3*tloss^2$$

$$Z_7 = (1-r_1)*(1-r_2)*(1-r_3)*(1-r_4)*r_1*r_2$$

and where:

$$r_1 = (n_0-n_1)^2/(n_0+n_1)^2$$

$$r_2 = (n_1-n_2)^2/(n_1+n_2)^2$$

$$r_3 = (n_2-n_3)^2/(n_2+n_3)^2$$

$$r_4 = (n_3-n_4)^2/(n_3+n_4)^2$$

and where:

$n_0 = n_4$ = refractive index of air = 1.0
$n_1 = n_3$ = refractive index of quartz at 1550 nm = 1.444
$n_2$ = refractive index of sample at 1550 nm FIG. 2 illustrates schematically the method by which shrinkage index was determined. A cuvette, 1, was filled with the cross-linkable liquid composition of the invention, and cross-linking was effected according to the indicated method herein below. The cross-linked composition, 2, exhibits a characteristic curvature at the surface. The line, 3, represents the height of the liquid composition prior to cross-linking. The line, 4, indicates the lowest point of the now curved surface of the cross-linked polymer. D" is the height of the line 3; D' is the depth of the point 4. The shrinkage index is simply = D'/D".

B. Preparation of poly-2,2,2-trifluoroethylacrylate

A glass polymerization tube was charged with 10 g of 2,2,2-trifluoroethylacrylate (Aldrich), 0.1 g 2,2'-azobisisobutyronitrile (Aldrich) and 10 ml tetrahydrofuran (THF). The tube was sealed, the contents frozen, the tube evacuated to <1 torr then flooded with nitrogen and then the contents thawed. The freeze-evacuate-thaw process was repeated two times. While maintaining a slight positive pressure of nitrogen, the tube was heated to 55° C. for 24 hr to effect polymerization. The resulting product mixture was dissolved in 50 ml of THF, then slowly added to 1.5 liter of vigorously stirred light petroleum ether maintained at −6° C. to precipitate the polymer. The polymer was collected and dried under vacuum with a slight nitrogen purge at 60° C. for 24 hr to yield 9.4 g of clear rubbery solid poly-2,2,2-trifluoroethylacrylate. Thermal analysis by DSC showed a glass transition temperature at Tg=−0.6° C.; molecular weight analysis by GPC showed Mn=106,800, Mw=697,900; refractive index=1.394 at 1550 nm.

Example 1

Fluorolink® E10 (HO—$(CH_2CH_2O)_kCH_2CF_2O(CF_2O)_m(CF_2CF_2O)_nCF_2CH_2(OCH_2CH_2)_k$—OH where m, n=integers, k=1-2, MW=1000; Solvay-Solexis) was converted to the corresponding embodiment of diacrylate I following the method disclosed in Comparative Example A of U.S. Pat. No. 6,496,637B2. Fluorolink® E10 (500 g) was combined with acryloyl chloride (100 g, Aldrich) and butylated hydroxy toluene (0.5 g, Aldrich) at 25° C. After vigorous stirring for 4 hr, the excess acryloyl chloride was evaporated from the reaction under reduced pressure. Triethyl amine (82 g, Aldrich) was slowly added with stirring at 0° C. to form a white precipitate. After stirring an additional 18 hr, the reaction mixture was washed three times with an equal volume of water to yield the corresponding diacrylate I. The resulting diacrylate I was combined with the embodiment of diacrylate II, where p=4 (octafluorohexane-1,6-diacrylate, Exfluor Research Corporation) in the weight ratios shown in Table 1, designated Examples 1.1-1.6. To each solution was added 7 pph of poly-2,2,2-trifluoroethylacrylate prepared herein above, and 2 pph Darocur-1173 (CIBA Additives). The compositions so prepared were stirred until homogeneous then filtered using a 0.2 μm filter.

An aliquot (0.25 ml) of a given composition in Table 1 was placed in the center of a glass slide (75 mm×25 mm×1 mm). A round cover slip of thin optical glass (25 mm×0.25 mm) was lowered onto the liquid composition causing it to spread out to the edge of the cover slip. The sample was then cured in open air by irradiation with 8 miliwatts/cm$^2$ of UV light from a Black-Ray® Model B-100-AP exposure unit for 5 min. After exposure the assembly was allowed to sit for 10 min before the glass cover slip was removed to yield a flat thin film. The film was baked in air at 100° for 24 hr. Refractive index was determined on films thus prepared for each composition using the method described herein above. Results are shown in Table 1, refer to FIG. 1, curve 1a.

TABLE 1

| Example | Diacrylate I (wt %) | Diacrylate II (wt %) | Refractive Index (1550 nm) |
|---|---|---|---|
| 1.1 | 41.7 | 58.3 | 1.392 |
| 1.2 | 52.0 | 48.0 | 1.387 |
| 1.3 | 62.6 | 37.4 | 1.379 |
| 1.4 | 71.4 | 28.6 | 1.372 |
| 1.5 | 80.8 | 19.2 | 1.366 |
| 1.6 | 88.8 | 11.2 | 1.361 |

Example 2

Fluorolink® D10 (HO—$CH_2CF_2O(CF_2O)_m(CF_2CF_2O)_nCF_2CH_2$—OH where m, n=integers, MW=1000; Solvay-Solexis), was converted to the corresponding embodiment of diacrylate I following the similar method in Example 1. Fluorolink® D10 (500 g) was combined with acryloyl chloride (100 g, Aldrich) and butylated hydroxy toluene (0.5 g, Aldrich) at 25° C. After vigorous stirring for 4 hr, the excess acryloyl chloride was evaporated from the reaction under reduced pressure. Triethyl amine (82 g, Aldrich) was slowly added with stirring at 0° C. to form a white precipitate. After stirring an additional 18 hr, the reaction mixture was washed three times with an equal volume of water to yield the corresponding diacrylate I.

The resulting diacrylate I was combined with the diacrylate II of Example 1 in the weight ratios shown in Table 2, designated Examples 2.1-2.4. To each solution was added 7 pph of poly-2,2,2-trifluoroethylacrylate prepared herein above, and 2 pph Darocur-1173. The compositions so prepared were stirred until homogeneous then filtered using a 0.2 μm filter.

Refractive index of the specimens so prepared was determined as in Example 1. Results are shown in Table 2, refer to FIG. 1, curve 1b.

TABLE 2

| Example | Diacrylate I (wt %) | Diacrylate II (wt %) | Refractive Index (1550 nm) |
|---|---|---|---|
| 2.1 | 33.0 | 67.0 | 1.391 |
| 2.2 | 44.1 | 55.9 | 1.383 |
| 2.3 | 53.5 | 46.5 | 1.374 |
| 2.4 | 63.5 | 36.5 | 1.366 |

Example 3

3-acryloxypropyl-1-trichlorosilane (Gelest Inc.) was dissolved in toluene to form an 11 wt % solution thereof. One short edge of each of a pair of 75 mm×25 mm×1 mm rectangular glass slides was treated with the solution so formed by wetting a cotton applicator with the above solution and then rubbing the wetted applicator across the surface to be treated for 15 seconds. Each so treated slide edge was rinsed with methyl alcohol and blown dry with a stream of filtered air.

One drop of the composition of Example 1.4 was applied to one of the 3-acryloxypropyl-1-trichlorosilane treated slide edges and spread evenly across the face to form a liquid layer. The treated edge of the other slide was brought into contact with the liquid layer disposed upon the first edge to form a butt connection. The joined structure was then cured in open air by irradiation with 8 mw/cm$^2$ of UV light from a Black-Ray® Model B-100-AP exposure unit for 5 min. A high dosage was used to ensure the reaction was complete and the liquid layer fully cured. After exposure the assembly was allowed to sit for 10 min before handling. After the 10 minute period it was observed that the slides had been bonded along the so-treated edges; the joint formed thereby was firm and rigid.

The joined slide structure was supported at each end, with the joint being suspended between supports, and the thus supported structure baked in a Fisher Isotemp® circulating air oven at 100° C. for 18 h. The adhesive joint remained rigid, there was no sagging of the assembly. A 143 g load was applied to the joint after cooling to room temperature. The joint did not fracture. After 5 hr at room temperature the load was removed. No deformation of the joint was observed.

Example 4

The materials and procedures of Example 3 were employed herein except that the composition of Example 2.3 was substituted for the composition of Example 1.4. The joint so formed was firm and rigid. After heating the suspended joint at 100° C. for 18 h, the adhesive joint remained rigid, there was no sagging of the assembly. After application of the 143 g load the joint did not fracture. After 5 hr the load was removed. No deformation of the joint was observed.

Example 5

The materials and procedure of Example 3 were employed herein except that 1 pph 3-acryloxypropyl-1-trimethoxysilane was added to the composition of Example 1.4, the slide edges were not treated with 3-acryloxypropyl-1-trichlorosilane, and the duration of exposure to the 143 g load was 2 hours not 5 hours. After baking at 100° C. for 18 hr, the adhesive joint remained rigid, there was no sagging of the assembly. After application of the 143 g load the joint did not fracture. After 2 hr the load was removed. No deformation of the joint was observed.

Example 6

The embodiment of diacrylate I of Example 1 was combined with the embodiment of diacrylate II of Example 1 at the weight ratio of 89.3:10.7. 2 pph of Darocur-1173 was added. The resulting mixture was stirred until homogeneous then filtered four times through a 0.2 µm filter in a dust-free environment into a dust-free quartz cuvette with a 1 cm path length. The cuvette was capped with a loose fitting Teflon® cap then placed into a quartz tube which was sealed with a rubber septum before removal of the assembly from the dust-free environment. A filtered nitrogen stream was directed via a long syringe needle through the rubber septum and down to the bottom of the quartz tube. The assembly was purged with nitrogen for 24 h. The composition in the cuvette was then cured by irradiation with a series of short bursts of 8 miliwatts/cm$^2$ of UV light from a Black-Ray® Model B-100-AP exposure unit for a total exposure time of 540 seconds. A high dosage was used to ensure the reaction was complete and the adhesive composition fully cured. The optical loss at 1550 nm was found to be −0.37 dB/cm and the refractive index was 1.359 at 1550 nm.

Comparative Example A

Figure 3:
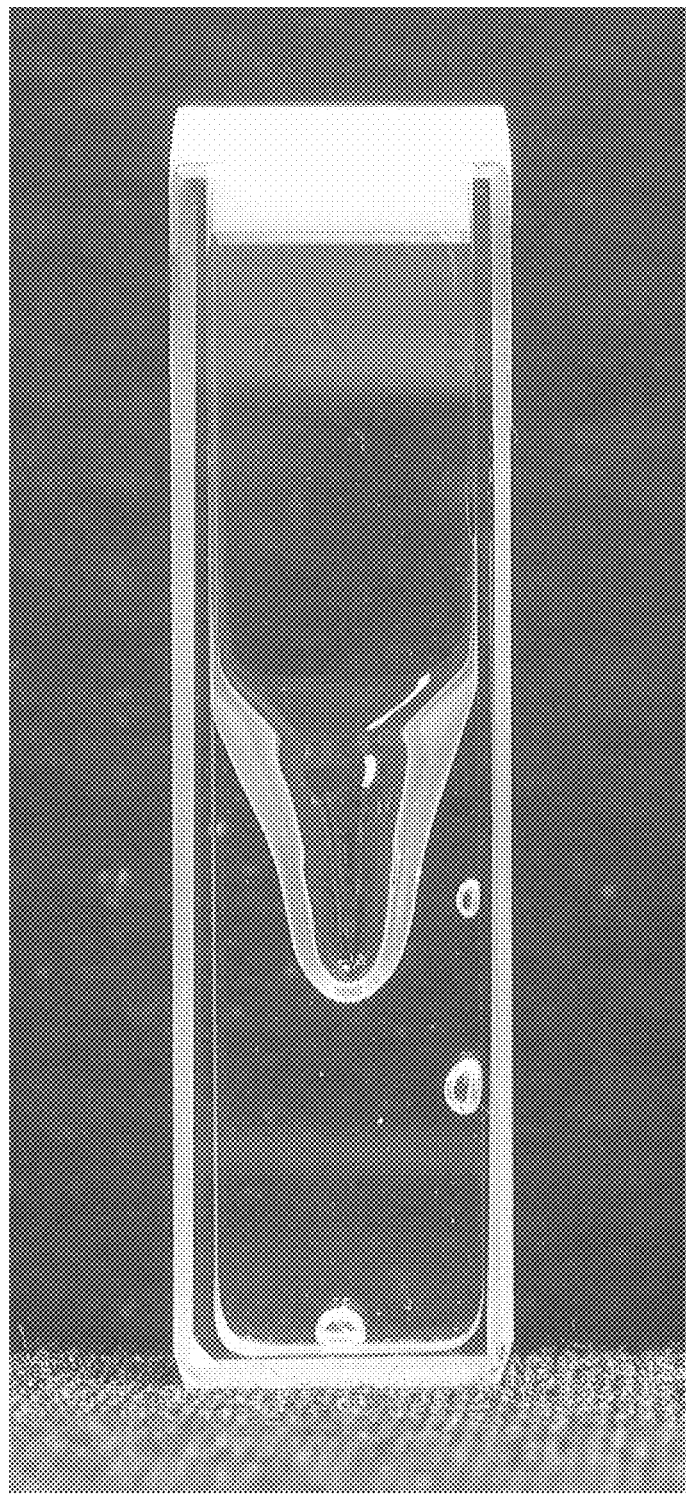
FIG. 3 shows a photograph of a cuvette containing a cured composition of U.S. Pat. No. 5,045,397.

A polymerizable liquid composition comprised of 2,2,2-trifluoroethyl acrylate (Aldrich) and 1 pph Irgacure-184 (CIBA Additives) was prepared and stirred until homogeneous then filtered five times, using a 0.2 µm filter, in a dust-free environment into a dust-free quartz cuvette with 1 cm path length. The cuvette was capped with a loose fitting Teflon® cap then placed into a quartz tube which was sealed with a rubber septum before removal of the assembly from the dust-free environment. A filtered nitrogen stream was directed via long syringe needle through the rubber septum and down to the bottom of the quartz tube. The assembly was purged with nitrogen for 24 hr. The polymerizable fluid composition in the cuvette was then cured by irradiation with a series of short bursts of 8 miliwatts/cm$^2$ of UV light from a Black-Ray® Model B-100-AP exposure unit for a total exposure time of 470 seconds. A high dosage was used to ensure the reaction was complete and the polymerizable fluid composition fully cured. The polymerizable fluid composition exhibits high shrinkage as evidenced by a deep depression in the top surface of the polymer plug as shown in FIG. 3. Shrinkage across curing was quantified by measuring the depth of the depression in the top surface after irradiation was complete. The shrinkage index was 0.5 as determined from the ratio of the depth of the depression to the height of the polymer plug in the cuvette (refer to FIG. 2). The optical loss at 1550 nm was −0.42 dB/cm. The refractive index was 1.393 at 1550 nm.

Example 7

The embodiment of diacrylate I of Example 1 was combined with the embodiment of diacrylate II of Example 1 to form three solutions shown in Table 3 as Examples 7.1-7.3. To each solution was added 2 pph Darocur-1173 (CIBA Additives). The compositions so formed were agitated until homogeneous then 3 ml of each was filtered once through a 0.2 µm filter into dust-free quartz cuvettes with 1 cm path length.

Figure 4:
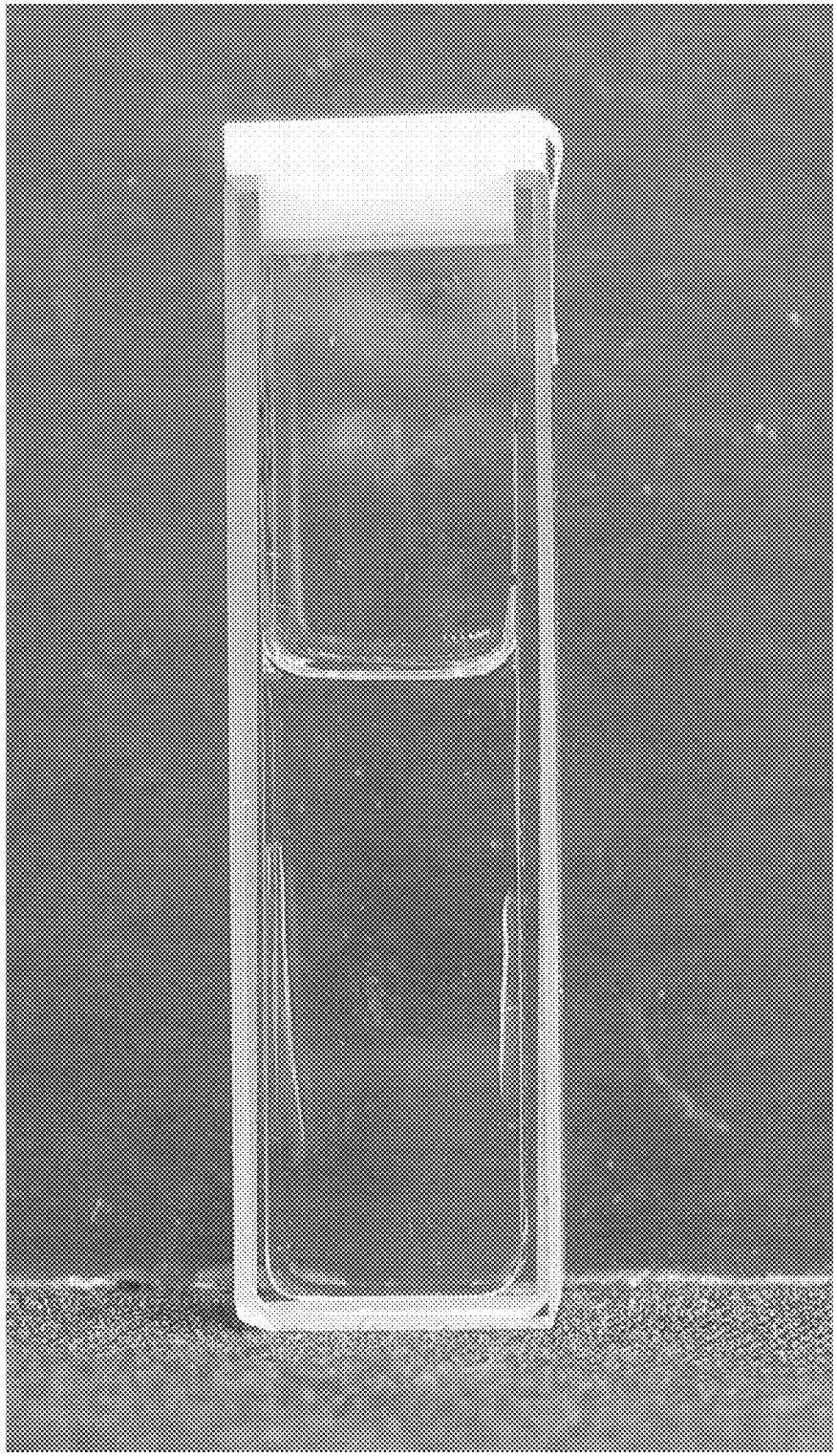
FIG. 4 shows a photograph of a cuvette containing a cured composition of the invention.

Curing was accomplished as in Example 6. Shrinkage index was 0.1 or less, as shown in Table 3, and illustrated for example 7.1 in FIG. 4.

TABLE 3

| Example | Diacrylate I (wt %) | Diacrylate II (wt %) | D-1173 (pph) | shrinkage index |
|---|---|---|---|---|
| 7.1 | 89.3 | 10.7 | 2 | 0.05 |
| 7.2 | 60.0 | 40.0 | 2 | 0.06 |
| 7.3 | 40.0 | 60.0 | 2 | 0.10 |

Example 8

3-acryloxypropyl-1-trichlorosilane (Gelest Inc.) was dissolved in toluene to form an 11 wt % solution thereof. The solution so formed was applied to one surface each of a first and a second 75 mm×25 mm×1 mm rectangular glass slides by rubbing the surface for 15 seconds with a cotton applicator wet with said solution. Each so treated slide was rinsed with methyl alcohol and blown dry with a stream of filtered air.

The embodiment of diacrylate I of Example 1 was combined with 2 pph of Darocur-1173. The resulting liquid mixture was stirred until homogeneous then filtered through a 0.2μ filter. A 0.25 ml aliquot of the liquid diacrylate I composition so formed was applied to the center of the treated surface on each glass slide. A round cover slip of thin optical glass (25 mm×0.25 mm) was lowered onto the said liquid composition on each slide, causing said liquid to spread out to the edge of the cover slip. The thus formed liquid film samples were then cured in open air by irradiation with 8 miliwatts/cm² of UV light from a Black-Ray® Model B-100-AP exposure unit for 5 min. After exposure the cured films were allowed to sit for 10 min before the glass cover slips were removed to yield flat fluoropolymer films disposed upon the respective surfaces of a first and a second glass slide. The thus formed fluoropolymer films were baked in air at 100° C. for 30 min.

An adhesive composition of the invention was prepared by combining the embodiment of diacrylate I of Example 1 with the embodiment of diacrylate II of Example 1 at the weight ratio of 89.3:10.7 and 2 pph of Darocur-1173 was added. The resulting mixture was stirred until homogeneous then filtered through a 0.2μ filter. Two drops ca. 0.1 ml of the adhesive composition so prepared was applied to the surface of the first fluoropolymer film described in the previous paragraph. The second fluoropolymer film was then brought into contact with the liquid adhesive residing on the first fluoropolymer film in such manner that the adhesive composition spread to evenly cover the two fluoropolymer surfaces. The glass slides were oriented perpendicular to each other. The adhesive composition was then cured in open air by irradiation with 8 miliwatts/cm² of UV light from a Black-Ray® Model B-100-AP exposure unit for 5 min. After exposure the assembly was allowed to sit for 10 min before handling. The thus treated fluoropolymer surfaces were bonded to each other, the joint was firm and rigid.

The joined structure was baked in a Fisher Isotemp® circulating air oven at 100° C. for 18 hr. The adhesive bond remained firm and rigid. A 144 g load was applied to the joint between the fluoropolymer films after cooling to room temperature. The joint did not fracture after 5 hr under load at room temperature. When the load was removed, no deformation of the joint was observed.

Example 9

The materials and procedures of Example 8 were employed herein except that 7 pph of poly-2,2,2-trifluoroethylacrylate prepared herein above was added to the adhesive composition. The thus treated fluoropolymer surfaces were bonded to each other, the joint was firm and rigid. The joined structure was baked in a Fisher Isotemp® circulating air oven at 100° C. for 18 hr. The adhesive bond remained firm and rigid. A 144 g load was applied to the joint between the fluoropolymer films after cooling to room temperature. The joint did not fracture after 5 hr under load at room temperature. When the load was removed, no deformation of the joint was observed.

Example 10

The procedures and materials of Example 8 were herein repeated with the exception the a fluoropolymer film was formed on the treated surface of only one of the two glass slides. Upon completion of the adhesive curing step, the thus treated surfaces of the fluoropolymer film and the glass slide were bonded, the joint was firm and rigid.

The joined structure was baked in a Fisher Isotemp® circulating air oven at 100° C. for 18 hr. The adhesive bond remained firm and rigid. A 144 g load was applied to the joint between the fluoropolymer film and the glass slide after cooling to room temperature. The joint did not fracture after 5 hr under load at room temperature. When the load was removed, no deformation of the joint was observed.

Example 11

The materials and procedures of Example 10 were employed herein except that 7 pph of poly-2,2,2-trifluoroethylacrylate prepared herein above was added to the adhesive composition. The thus treated surfaces of the fluoropolymer film and the glass slide were bonded to each other, the joint was firm and rigid. The joined structure was baked in a Fisher Isotemp® circulating air oven at 100° C. for 18 hr. The adhesive bond remained firm and rigid. A 144 g load was applied to the joint between the fluoropolymer film and the glass slide after cooling to room temperature. The joint did not fracture after 5 hr under load at room temperature. When the load was removed, no deformation of the joint was observed.

What is claimed is:

1. A liquid composition comprising a first diacrylate, I,

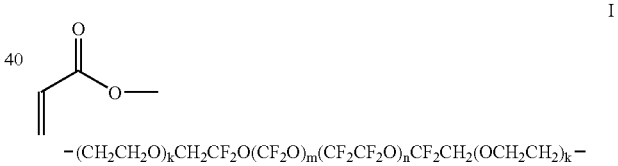

$-(CH_2CH_2O)_kCH_2CF_2O(CF_2O)_m(CF_2CF_2O)_nCF_2CH_2(OCH_2CH_2)_k-$

wherein m and n are integers, k=0-2, and the molecular weight is in the range of 1000 to 4000 Da; and a second diacrylate, II,

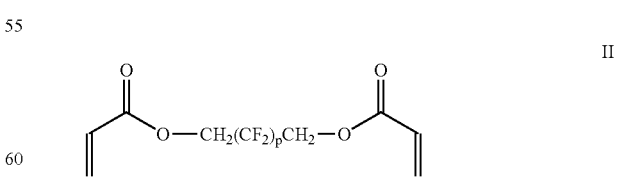

where p=2-6.

2. The composition of claim 1 wherein the weight ratio of diacrylate I to diacrylate II is in the range of 30:70 to 90:10, and further comprising 0.5 to 10 pph of a polymer including a repeat unit represented by the formula III

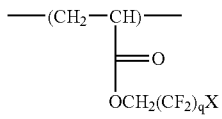

III where q=1-2 and X=F or H.

3. The composition of claim 1 or claim 2 further comprising 0.5 to 5 pph of a soluble free-radical initiator.

4. The composition of claim 2 wherein the molecular weight of diacrylate I is in the range of 1000-2000, k=0, p=4, and the weight ratio of diacrylate I to diacrylate II is in the range of 40:60 to 80:20, while polymer including a repeat unit represented by the formula III, where q=1 and X=F, is present at a concentration of 7 pph.

5. The composition of claim 2 wherein the molecular weight of diacrylate I is in the range of 1000-2000, k=1 or 2, p=4 and the weight ratio of diacrylate I to diacrylate II is in the range of 60:40 to 90:10, while polymer including a repeat unit represented by the formula III, where q=1 and X=F, is present at a concentration of 7 pph.

* * * * *